United States Patent
Zhang et al.

(10) Patent No.: US 9,459,883 B2
(45) Date of Patent: Oct. 4, 2016

(54) MODIFYING DISK IMAGES

(71) Applicants: Haiyang Zhang, Beijing (CN); Xiaopin Wang, Beijing (CN); Victor Liu, Beijing (CN); Shaorong Li, Beijing (CN)

(72) Inventors: Haiyang Zhang, Beijing (CN); Xiaopin Wang, Beijing (CN); Victor Liu, Beijing (CN); Shaorong Li, Beijing (CN)

(73) Assignee: CA, Inc., New York, NY (US)

( * ) Notice: Subject to any disclaimer, the term of this patent is extended or adjusted under 35 U.S.C. 154(b) by 320 days.

(21) Appl. No.: 14/199,352

(22) Filed: Mar. 6, 2014

(65) Prior Publication Data
US 2015/0254080 A1    Sep. 10, 2015

(51) Int. Cl.
*G06F 9/44* (2006.01)

(52) U.S. Cl.
CPC .............. *G06F 9/4406* (2013.01); *G06F 9/441* (2013.01)

(58) Field of Classification Search
CPC ................................ G06F 9/4406; G06F 9/441
See application file for complete search history.

(56) References Cited

U.S. PATENT DOCUMENTS

| | | | |
|---|---|---|---|
| 7,330,967 B1 * | 2/2008 | Pujare | G06F 8/63 713/100 |
| 8,364,638 B2 * | 1/2013 | Nickolov | G06F 9/4856 707/636 |
| 8,874,888 B1 * | 10/2014 | Beda, III | G06F 9/4416 709/222 |
| 2010/0138642 A1 * | 6/2010 | Cherian | G06F 9/4401 713/2 |
| 2011/0197053 A1 * | 8/2011 | Yan | G06F 8/64 713/2 |

* cited by examiner

*Primary Examiner* — Dennis M Butler
(74) *Attorney, Agent, or Firm* — Baker Botts L.L.P.

(57) ABSTRACT

A method includes identifying a first boot configuration type for a disk image. The disk image includes a master boot record and a disk partition. The disk partition comprises a volume boot record. The master boot record comprises first instructions for loading an operating system, and the volume boot record comprises second instructions for loading the operating system. The method further includes receiving an input indicative of a second boot configuration type. The method also includes modifying the disk image to use the second boot configuration type to load the operating system by modifying the first instructions and the second instructions.

20 Claims, 3 Drawing Sheets

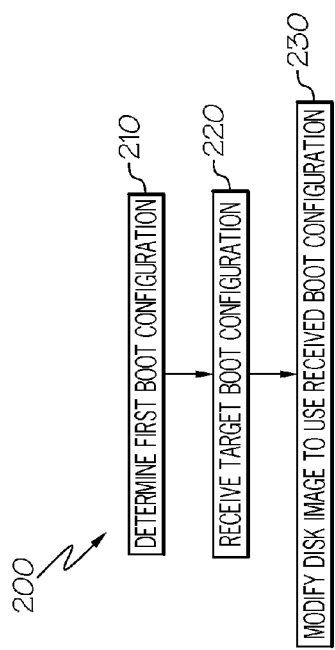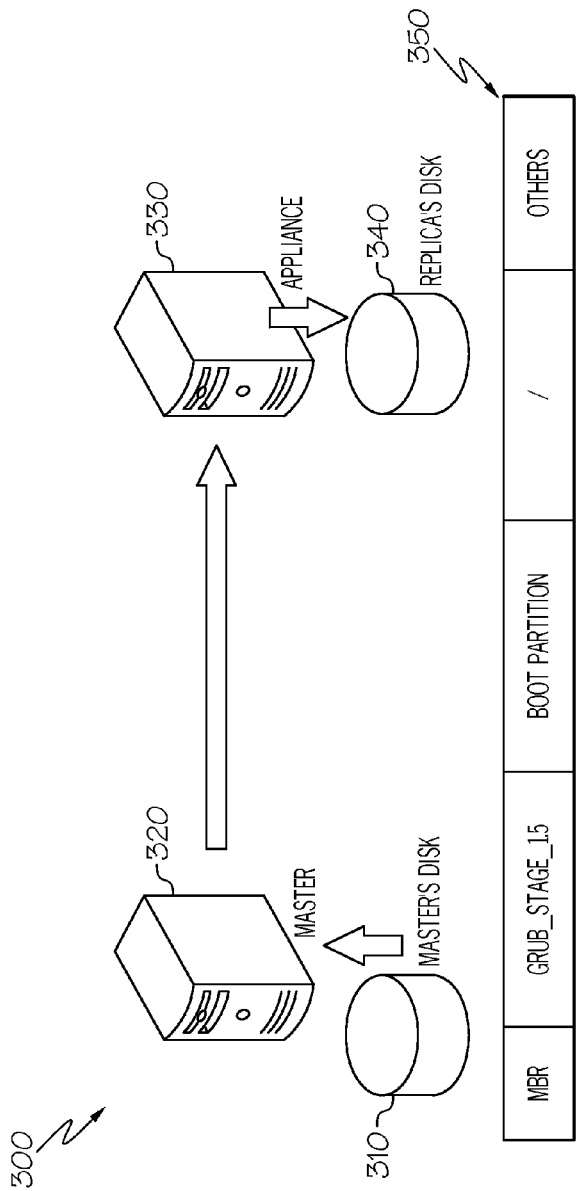

MODIFYING DISK IMAGES

BACKGROUND

The disclosure relates generally to disk images, and more specifically to modifying disk images.

SUMMARY

According to one embodiment of the disclosure, a method includes identifying a first boot configuration type for a disk image. The disk image includes a master boot record and a disk partition. The disk partition comprises a volume boot record. The master boot record comprises first instructions for loading an operating system, and the volume boot record comprises second instructions for loading the operating system. The method further includes receiving an input indicative of a second boot configuration type. The method also includes modifying the disk image to use the second boot configuration type to load the operating system by modifying the first instructions and the second instructions.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

FIG. 2 illustrates a flowchart of a method for modifying disk images in accordance with a non-limiting embodiment of the present disclosure.

FIG. 3 illustrates a block diagram of a system for modifying disk images in accordance with another non-limiting embodiment of the present disclosure.

DETAILED DESCRIPTION

Figure 1:
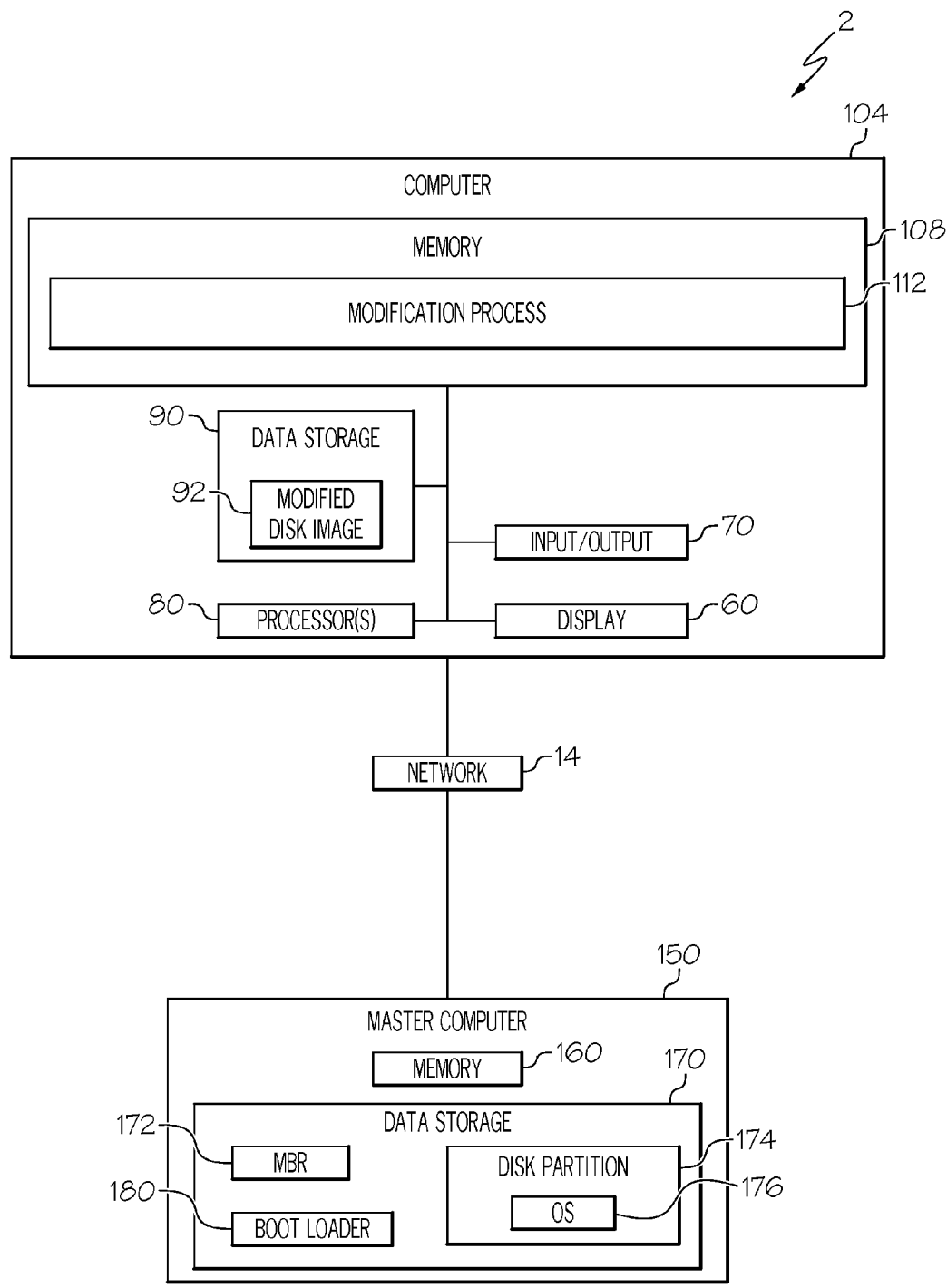
FIG. 1 illustrates a block diagram of a system for modifying disk images in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Disk replication and data migration processes for replicating physical and virtual systems to portable disk images are important system management components. These processes are particularly important as organizations increase their use of virtualization. Organizations may migrate and/or replicate disks between physical machines and virtual machines. Organizations may also migrate and/or replicate disks from physical to virtual machines and from virtual to physical machines. Some replicated disk images are produced for use in specialized systems, configured to maximize performance and efficiency for a specific use. For example, a replicated disk image from a physical machine may be migrated for use in an embedded system. However, hardware specifications such as disk capacity or medium for the target system may be different than the master system. Additionally, system boot performance on the target system may be more critical than boot performance on the master system. For example, areas of the master disk between partitions that are left blank may be used for storing a boot volume for the target disk. As another example, a chained boot loader configuration from the master system may be less desirable than a higher performance boot configuration that may enable faster boot times on the target system.

With reference to FIG. 1 a system 2 for modifying disk images is illustrated in accordance with a non-limiting embodiment of the present disclosure. System 2 includes computer 104, network 14, and master computer 150. Computer 2 includes memory 108, data storage 90, processor 80 input/output ("I/O") 70 and display 60. In certain embodiments, master computer 150 generates a disk image of itself (e.g., a replica image) and sends it to computer 104 via network 14. The replica image contains a snapshot of data storage 170, including master boot record ("MBR") 172, boot loader 180, disk partition 174 and operating system 176. Computer 104 processor 80 loads modification process 112 into memory 108 from data storage 90. Modification process 112 loads the replica image into memory and determines aspects of the replica image such as boot configuration, partition size and partition file system formatting. Modification process 112 presents the user with a graphical user interface ("GUI") that contains, for example, the current boot configuration, partition size, and partition file system formatting. The user may select a desired boot configuration and/or desired partition file system formatting. Modification process 112 modifies the replica image according to the user selections by modifying the master boot record, volume boot record, and partition configuration of the replica image. The result of one or more of these operations is modified disk image 92, which may remain in memory, be sent to another computer or device, or be stored on an internal disk drive.

In certain embodiments, computer 104 may be a virtual appliance, virtual machine, server, virtual server or other device. Modification process 112 may use input/output 70 to display and/or receive input from a GUI. In certain embodiments, modification process 112 may receive input from a configuration file or hard coded instructions regarding which boot configuration is desired for use in the replica image.

In certain embodiments, master computer 150 may include a process for generating disk images of itself and/or other systems connected to network 14. In certain embodiments, a system connected to network 14 may generate replica disk images of master computer 150, including replica images of virtual systems running on master computer 150.

In certain embodiments, modification process 112 may generate replica images of master computer 150. For example, modification process 112 may create and/or have access to a workspace for modifying master computer 150 disk images. In certain embodiments, the workspace may be located on data storage 90. In certain embodiments, the workspace may be an appliance connected to network 14. Modification process 112 may boot an appliance and modify disk images using the appliance.

In certain embodiments, data storage 170 may have varying configurations. For example, data storage 170 has one or more chain boot loaders linked together to load a variety of operating systems. As another example, data storage 170 may have any number of disk partitions containing any number of operating systems and file system formats. Master boot record may be configured to load boot loader 180, or may load a boot loader directly from disk partition 174 or any other disk partition.

In certain embodiments, a user may select a disk partition file system format, disk partition size, number of disk partitions, and any other disk partition configuration options in addition to the boot configuration options. For example, the user may wish to expand the size of disk partition 174 in modified disk image 92 to fit a larger hard drive on a target machine on which modified disk image 92 will be loaded on to and/or used on or with.

In certain embodiments, the GUI may present the user with several boot configurations. For example, the GUI may permit the user to select between Grand Unified Bootloader ("GRUB") version 1 and GRUB version 2 boot configurations. The GUI may indicate that the current replica image boot format is GRUB version 1, but the user would prefer to modify the replica image to use GRUB version 2 to take advantage of the increased boot performance capabilities. Modification process 112 may locate and modify the master boot record of the replica disk image in order to directly load a volume boot record in the disk partition. The volume boot record contains a boot loader. The boot loader may load an operating system kernel from the disk partition into memory and execute it.

In certain embodiments, Linux Physical to Virtual ("P2V"), Virtual to Physical ("V2P"), and Physical to Physical ("P2P") software may migrate an operating system to a raw disk image. Such software may additionally configure the operating system disk images such that that are bootable on various host environments. For example, on a Linux system the kernel images are usually stored in a specific partition called the boot volume. When migrating an operating system to an embedded system, a user may prefer to switch the file system of the target boot volume from ext4 to reiserFS. The user may consider efficiency of smaller files and performance requirements for the embedded system when determining what file system format to migrate to.

In certain embodiments, teachings of the present disclosure may enable users to modify the boot configuration of operating systems migrated and/or replicated using P2V, V2P, and/or P2P software, thus allowing the user to optimize efficiency and performance for the migrated system, while maintaining the boot configuration of a master, host, test, and/or development environment.

In certain embodiments, disk image may refer to any single file or storage device that contains the data and structure of any data storage medium, such as a disk or tape.

References to disk, hard disk, disk image, disk drive, or the like in the present disclosure may refer to one or more of a hard drive, tape drive, floppy disk, optical disk, solid state drive, USB drive, virtual storage drive, virtual disk drive, or any other storage medium or virtual structure representing a storage medium. References to appliance, virtual appliance or virtual machine may refer to any virtual representation of a computing system. Further, use of any of these terms or related terms in example embodiments of the present disclosure should not limit the scope of the disclosure to those example systems. For example, an embodiment discussing a migration process implemented on a virtual appliance may be implemented on a physical machine, or any combination of physical and virtual machines.

FIG. 2 illustrates a system 200 for modifying disk images in accordance with a non-limiting embodiment of the present disclosure. With reference to FIG. 2, system 200 determines a first boot configuration of a disk image. In certain embodiments, computer 104 creates the disk image. Computer 104 may receive and/or retrieve the disk image from another device on network 14.

The boot configuration may be determined by examining boot sectors and partitions of the disk as discussed below. For example, the blocks of a disk image are inspected for segments, sectors, operating systems, and partitions. If instructions or code in the master boot record is configured to load data from the disk padding in between the master boot record and the first disk partition, modification process 112 from FIG. 1 may determine that the disk image has a GRUB version 1 boot configuration. Modification process 112 may verify this by following the memory address trail to the disk padding between the partition and the master boot record to determine whether GRUB stage 1.5 boot loader is present. Modification process 112 may additionally verify that the GRUB stage 1.5 boot loader is configured to load a GRUB stage 2 boot loader from a boot sector at the beginning of a disk partition. In certain embodiments, errors in the boot loader may be identified and displayed to the user.

In certain embodiments, modification process displays a mapping of the boot configuration parameters and disk partition parameters to the user. In other embodiments, the user merely selects the preferred boot configuration from a list of boot configurations presented via a web page or display.

At step 220, modification process 112 from FIG. 1 receives input from a user that specifies a target boot configuration. The target boot configuration corresponds to the configuration the user desires to apply to a target disk image. In certain embodiments, the input may be received from an XML file or some other program that sends parameters from a configuration file, database, or hard coded instruction to modification process 112 describing which boot configuration the disk image should use. In certain embodiments, a user enters the target boot configuration in addition to other boot configuration parameters and partitioning parameters into a web page.

At step 230, the disk image is modified to use the boot configuration received during step 220. For example, modification process 112 may modify master boot record code to load a GRUB stage 2 boot loader from a volume boot record located in the beginning of a disk partition. In this example, the volume boot record may also need to be modified to load the operating system since partition configuration changes may affect the physical location of operating system kernel files. As another example, modification process 112 may modify master boot record code to load a GRUB stage 1.5 boot loader from a separate partition. In other examples, an existing GRUB stage 1.5 boot loader may be modified to load a different GRUB stage 2 boot loader from a different partition. In this example, the master boot record may not require modifications.

In certain embodiments, other aspects of the disk image may be modified. For example, the size and location of various partitions may be modified using modification process 112. This may be accomplished by copying disk blocks from one physical memory address on the disk image to another. Modification process 112 must modify boot loaders and other components if such a change is made to the physical location of the operating system kernel, since these memory blocks are required for operating system startup.

FIG. 3 illustrates a block diagram of a system for modifying disk images, in accordance with a non-limiting embodiment of the present disclosure. With reference to FIG. 3, a system contains a master system 320, master disk 310, appliance 330, and replica disk 340. Disk block diagram 350 shows the disk blocks that may be modified during the modification process. In certain embodiments, master system 320 gathers a protected volume's information (e.g., partition, boot configuration, boot style, etc.) and sends them to appliance 330. A program or process may run in memory on master system 320 in order to send the volume information to appliance 330. Appliance 330 creates replica disk 340 and partitions and formats them as specified by master system 320. For example, master system 320 may determine the layout and disk mapping configuration for the replica disks.

Master system 320 synchronizes the MBR and boot loaders of replica disk 340. For example, if any formatting or configuration modifications are made to replica disk 340, master system 320 synchronizes and coordinates those modifications with the MBR and/or GRUB stage 1.5, GRUB stage 2, etc. Master system 320 may additionally determine which sector of replica disk to write or store any boot loader or operating system file.

Master system 320 synchronizes and replicates files in the boot volume and any operating system or storage volume on to Appliance 330. Appliance 330 may write the incoming disk image data from master system 320 to replica disk 340.

In certain embodiments, volume snapshot technology may be used to generate directory snapshots as windows. This may allow the freeze and unfreeze process to be removed. For example, certain volume snapshot software periodically scans a hard disk or disk image and updates a shadow copy of the disk. The snapshot software may even scan locked memory blocks. Thus, an up to date shadow copy of the disk or disk image may be available, and the whole disk may not need to be scanned in order to replicate the disk.

In certain embodiments, appliance 330 invokes a GRUB command to modify fields in the MBR, or any GRUB stages and/or other boot loaders. For example, appliance 330 modifies the disk blocks on the replica disk as depicted in disk block diagram 350.

In certain embodiments, appliance 330 may use driver injection. For example, appliance 330 may repackage a file in replica disk 340 boot volume to replace the serial computer system interface ("SCSI") drive for replica disk 340.

Appliance 330 may modify other files in replica disk 340. For example, appliance 330 may modify the file systems table in a Linux operating system. Replica disk 340 may then be bootable after completion of some or all of the above enumerated steps.

Figure 4:
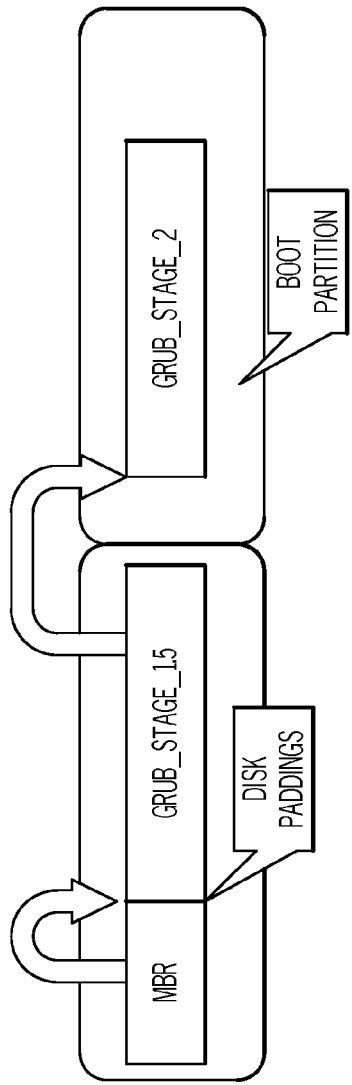
FIG. 4 illustrates a block diagram of disk blocks of a disk image implementing the Grand Unified Bootloader ("GRUB") version 1 in accordance with a non-limiting embodiment of the present disclosure.

FIG. 4 illustrates a block diagram of disk blocks implementing GRUB version 1 in accordance with a non-limiting embodiment of the present disclosure. In certain Linux distributions, such as Red Hat and SUSE, the default operating system boot loader is GRUB. In such configurations, the MBR contains a field to indicate where the first sector of the next stage (e.g., GRUB stage 1.5 or GRUB stage 2) is located.

In certain embodiments, the MBR loads the next GRUB stage sector into memory and executes the loaded boot loader code, which in turn instructs the processor to load the rest of the its code from disk into memory.

Varying embodiments may contain one of several boot configurations. The following examples show two such configurations.

With reference to FIG. 4, on system startup the processor is configured to load instructions from the MBR by default. These instructions tell the processor to load the GRUB stage 1.5 disk block code, which then instructs the processor to load the GRUB stage 2 disk block code.

In certain embodiments, replication process 112 from FIG. 1 may write the contents of the GRUB stage 1.5 that is specific to the file system format of the boot volume immediately adjacent to the MBR in the unallocated disk space (i.e., padding). GRUB stage 1.5 files may be bundled with a specific file system because of the small size of the disk paddings, e.g., around 30,000 Bytes.

In certain embodiments, the GRUB stage 1.5 code may be small enough to fit into the padding hole, i.e., the unallocated disk space, on the disk image. GRUB stage 1.5 instructions search the GRUB stage 2 file in the boot volume and recognize the file system format of the boot volume. The GRUB stage 1.5 code then loads the GRUB stage 2 code into memory. Due to the limited size constraints of GRUB 1.5 sectors, the GRUB stage 1.5 code may not be able to recognize all such file system formats or boot configurations.

In certain embodiments, during execution of the GRUB stage 2 code, the operating system kernel will be loaded into memory and executed. GRUB stage 2 code may be significantly more robust than the GRUB stage 1.5 code because GRUB stage 2 may not have the same size constraints that GRUB stage 1.5 code has. GRUB stage 2 code may not be stored in disk padding between partitions, and thus may have a much larger memory size. Additionally, GRUB stage 2 code may be scattered in different areas of the disk, and can direct the processor as to where to load other GRUB stage 2 instructions from.

Figure 5:
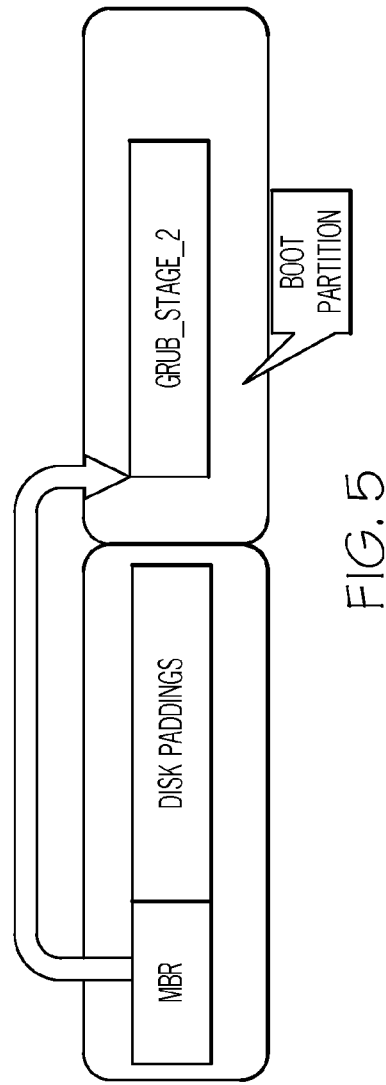
FIG. 5 illustrates a block diagram of disk blocks of a disk image implementing GRUB version 2 in accordance with a non-limiting embodiment of the present disclosure.

FIG. 5 illustrates a block diagram of disk blocks implementing GRUB version 2 in accordance with a non-limiting embodiment of the present disclosure. With reference to FIG. 5, the system starts up and loads instructions from the MBR into memory. The MBR code instructs the processor to directly load the date from the GRUB stage 2 disk blocks into memory.

In certain embodiments, GRUB stage 1.5 may not be loaded into memory during the system startup process. For example, the MBR can load the first sector of GRUB stage 2 into memory. The GRUB stage 2 code identifies other locations in the disk that contain additional GRUB stage 2 code.

In certain embodiments, the master system may analyze its own MBR. For example, the master system may determine the sector that the MBR is being written to on the migrated disk. As another example, the MBR may identify which GRUB version and/or stage type that the MBR is configured for. Based on this information, the GRUB stage 1.5 can be written in the correct location on the replica disk, and modifications to the placement of GRUB sectors and the MBR can be made by modification process 112. In certain embodiments, these modifications are made with GRUB commands invoked at the command line. In other embodiments, code scripts designed to modify fields in the MBR, GRUB stage 1.5 and/or GRUB stage 2 code are run.

In certain embodiments, the present disclosure may enable and/or assist a system administrator in facilitating migration of disk images to a variety of boot configurations. For example, an administrator may use a specific partition for GRUB state 1.5. The administrator may want the MBR to load GRUB stage 2 directly instead of through an extra GRUB stage 1.5. Using aspects of the present disclosure, the administrator may create a disk image using the desired boot configuration while keeping the operating system and other partitions from the master disk.

In certain embodiments, the partitions on a replica may be different than the master disk. For example, a user replicating a disk image may want to make some changes to the partitions of the replica. In this example, the master disk may not have a specific partition to store GRUB stage 1.5, which is sometimes stored in the padding between the MBR and the first partition. The user may want the replica to have a separate disk partition to store GRUB stage 1.5. Certain embodiments of the present disclosure may enable those of skill in the art to modify partitions on the replica disk.

As another example, a master disk may have a GRUB stage 1.5 that loads GRUB stage 2. A user may want to change the boot configuration of the replica image. For example, the user may want to eliminate the GRUB stage 1.5 on the replica. Aspects of the present disclosure may enable one of ordinary skill in the art to modify the boot configuration to accomplish this, such as by modifying the MBR to load the GRUB stage 2 directly on the replica disk.

In certain embodiments, a GUI may be provided to allow for modifying the disk of the replica with a desired layout. In certain embodiments, a virtual appliance may be used to facilitate creation of the replica disk. For example, the virtual appliance migrates a master disk image to a replica disk image and may format partitions of the replica disk image. The virtual appliance may format the boot partition with a specified file system format that may be different from the file system of the boot partition on the master disk. The virtual appliance may synchronize and replicate all of the files of the boot partition and other related volumes on the replica. The virtual appliance may also adjust the replica's MBR, GRUB stage 1.5, and/or GRUB stage 2 code.

In other examples, the master system may replicate its own hard disk to a virtual appliance. The virtual appliance may format the replica image and modify the boot configuration after replication is complete.

In certain embodiments, if the file system of the boot partition is changed between the master and replica disk image, a virtual appliance may copy boot loaders corresponding to the new file system to the corresponding disk logical block address of the replica. For example, a virtual appliance may copy a GRUB stage 1.5 boot loader corresponding to the new file system format to the correct logical block address on the replica disk so that the MBR can load it correctly.

In certain embodiments, further adjustments may be required to ensure the boot loader is loaded correctly. The virtual appliance may adjust the replica image accordingly.

In certain embodiments, if the master system has a GRUB stage 1.5 boot loader, but, due to user configuration choices or other circumstances, the replica does not, the virtual appliance does not copy the GRUB stage 1.5 to the replica disk image. Instead, fields in the GRUB stage 2 boot loader are modified to enable it to load itself.

In certain embodiments, modifications to the boot configuration of the replica image may be accomplished using GRUB commands. In certain embodiments, modifications are made using software.

In certain embodiments, the teachings of the present disclosure enable one of ordinary skill in the art to rebuild boot loaders for Linux P2V, V2P and P2P while making modifications to the disk image using, for example, driver injection.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
identifying a first boot configuration type for a disk image, the disk image comprising a master boot record and a disk partition; wherein the disk partition comprises a volume boot record, the master boot record comprises first instructions for loading an operating system, and the volume boot record comprises second instructions for loading the operating system;
receiving an input indicative of a new file system format for the disk partition;
determining a second boot configuration type corresponding to the new file system format; and
modifying the disk image to use the second boot configuration type to load the operating system by modifying the first instructions and the second instructions, installing a boot loader associated with the second boot configuration type, and reformatting the partition to the new file system format.

2. The method of claim 1, wherein the master boot record further comprises third instructions for loading an intermediate boot loader that loads the volume boot record, and wherein modifying the disk image further comprises modifying the third instructions to comprise fourth instructions for loading the boot volume record.

3. The method of claim 1, wherein modifying the disk image further comprises storing an intermediate boot loader in a disk padding between the master boot record and the disk partition, the modified first instructions are configured to load the intermediate boot loader, and the intermediate boot loader is configured to load the modified second instructions.

4. The method of claim 1, wherein the disk partition has a first file system format, the input is further indicative of a second file system format, and modifying the disk image further comprises reformatting the disk partition into the second file system format.

5. The method of claim 4, wherein modifying the disk image further comprises updating a reference to the second instructions in the first instructions based on a memory address of the volume boot record on the reformatted disk partition.

6. The method of claim 1, further comprising formatting the first boot configuration type for display, wherein the input is received in response to formatting the first boot configuration type for display.

7. The method of claim 1, wherein the input is further indicative of a number of bytes of memory, and wherein modifying the disk image further comprises modifying the disk partition to occupy a memory space on the disk image equal to the number of bytes of memory.

8. A computer configured to access a storage device, the computer comprising:
a processor; and
a non-transitory, computer-readable storage medium storing computer-readable instructions that when executed by the processor cause the computer to perform:
identifying a first boot configuration type for a disk image, the disk image comprising a master boot record and a disk partition; wherein the disk partition comprises a volume boot record, the master boot record comprises first instructions for loading an operating system, and the volume boot record comprises second instructions for loading the operating system;

receiving an input indicative of a new file system format for the disk partition;

determining a second boot configuration type corresponding to the new file system format; and modifying the disk image to use the second boot configuration type to load the operating system by modifying the first instructions and the second instructions, installing a boot loader associated with the second boot configuration type, and reformatting the partition to the new file system format.

9. The computer of claim 8, wherein the master boot record further comprises third instructions for loading an intermediate boot loader that loads the volume boot record, and wherein modifying the disk image further comprises modifying the third instructions to comprise fourth instructions for loading the boot volume record.

10. The computer of claim 8, wherein modifying the disk image further comprises storing an intermediate boot loader in a disk padding between the master boot record and the disk partition, the modified first instructions are configured to load the intermediate boot loader, and the intermediate boot loader is configured to load the modified second instructions.

11. The computer of claim 8, wherein the disk partition has a first file system format, the input is further indicative of a second file system format, and modifying the disk image further comprises reformatting the disk partition into the second file system format.

12. The computer of claim 11, wherein modifying the disk image further comprises updating a reference to the second instructions in the first instructions based on a memory address of the volume boot record on the reformatted disk partition.

13. The computer of claim 8, wherein the computer-readable instructions further cause the computer to perform formatting the first boot configuration type for display, wherein the input is received in response to formatting the first boot configuration type for display.

14. The computer of claim 8, wherein the input is further indicative of a number of bytes of memory, and wherein modifying the disk image further comprises modifying the disk partition to occupy a memory space on the disk image equal to the number of bytes of memory.

15. A computer program product, comprising:

a computer-readable storage medium having computer-readable program code embodied therewith, the computer-readable program code comprising:

computer-readable program code configured to identify a first boot configuration type for a disk image, the disk image comprising a master boot record and a disk partition; wherein the disk partition comprises a volume boot record, the master boot record comprises first instructions for loading an operating system, and the volume boot record comprises second instructions for loading the operating system;

computer-readable program code configured to receive an input indicative of a new file system format for the disk partition;

computer-readable program code configured to determine a second boot configuration type corresponding to the new file system format; and computer-readable program code configured to modify the disk image to use the second boot configuration type to load the operating system by modifying the first instructions and the second instructions, installing a boot loader associated with the second boot configuration type, and reformatting the partition to the new file system format.

16. The computer program product of claim 15, wherein the master boot record further comprises third instructions for loading an intermediate boot loader that loads the volume boot record, and wherein modifying the disk image further comprises modifying the third instructions to comprise fourth instructions for loading the boot volume record.

17. The computer program product of claim 15, wherein modifying the disk image further comprises storing an intermediate boot loader in a disk padding between the master boot record and the disk partition, the modified first instructions are configured to load the intermediate boot loader, and the intermediate boot loader is configured to load the modified second instructions.

18. The computer program product of claim 15, wherein the disk partition has a first file system format, the input is further indicative of a second file system format, and modifying the disk image further comprises reformatting the disk partition into the second file system format.

19. The computer program product of claim 17, wherein modifying the disk image further comprises updating a reference to the second instructions in the first instructions based on a memory address of the volume boot record on the reformatted disk partition.

20. The computer program product of claim 15, further comprising formatting the first boot configuration type for display, wherein the input is received in response to formatting the first boot configuration type for display.

* * * * *